United States Patent
Sasagawa et al.

(10) Patent No.: US 7,551,218 B2
(45) Date of Patent: Jun. 23, 2009

(54) DIGITAL CAMERA WITH A MODE SELECTABLE STRUCTURE

(75) Inventors: Mikio Sasagawa, Saitama (JP); Masafumi Hirata, Saitama (JP)

(73) Assignee: Fujifilm Corporation, Tokyo (JP)

( * ) Notice: Subject to any disclaimer, the term of this patent is extended or adjusted under 35 U.S.C. 154(b) by 870 days.

(21) Appl. No.: 11/078,579

(22) Filed: Mar. 14, 2005

(65) Prior Publication Data
US 2005/0200729 A1    Sep. 15, 2005

(30) Foreign Application Priority Data
Mar. 15, 2004  (JP) .............. 2004-072332
Mar. 15, 2004  (JP) .............. 2004-072333

(51) Int. Cl.
*H04N 5/222*    (2006.01)
(52) U.S. Cl. .............. 348/333.04; 348/333.01; 348/333.02
(58) Field of Classification Search .............. 348/333.01–333.13
See application file for complete search history.

(56) References Cited

U.S. PATENT DOCUMENTS

| | | | |
|---|---|---|---|
| 5,235,374 A * | 8/1993 | Kobayashi et al. .......... | 396/80 |
| 5,467,162 A * | 11/1995 | Goo .......................... | 396/98 |
| 5,583,602 A * | 12/1996 | Yamamoto .................. | 396/133 |
| 6,192,198 B1 | 2/2001 | Kitani et al. | |
| 6,535,248 B1 * | 3/2003 | Hatakeyama .......... | 348/333.09 |
| 2001/0022624 A1 * | 9/2001 | Tanaka et al. .......... | 348/333.02 |
| 2003/0071911 A1 * | 4/2003 | Shinohara et al. .......... | 348/370 |
| 2003/0197804 A1 * | 10/2003 | Ito .............................. | 348/345 |

FOREIGN PATENT DOCUMENTS

| | | |
|---|---|---|
| JP | 6-194732 A | 7/1994 |
| JP | 8-076238 A | 3/1996 |
| JP | 10-341359 | * 12/1998 |

* cited by examiner

*Primary Examiner*—David L Ometz
*Assistant Examiner*—Richard M Bemben
(74) *Attorney, Agent, or Firm*—Birch, Stewart, Kolasch & Birch, LLP

(57) ABSTRACT

A digital camera has a shutter release button. A mode selector sets a selected one of a regular photographing mode and a macro photographing mode adapted to image pickup at a nearer distance of close-up than the regular photographing mode. An LCD display panel as a user interface has an alarm generating region which outputs an alarm signal visually as an enlarged alarm icon, and/or a sound source as a user interface audibly outputs sound of alarm message voice. A controller is responsive to depression of the shutter release button, for mode discernment by checking a state of the mode selector. The LCD and/or sound source is driven if the macro photographing mode is set selectively.

14 Claims, 6 Drawing Sheets

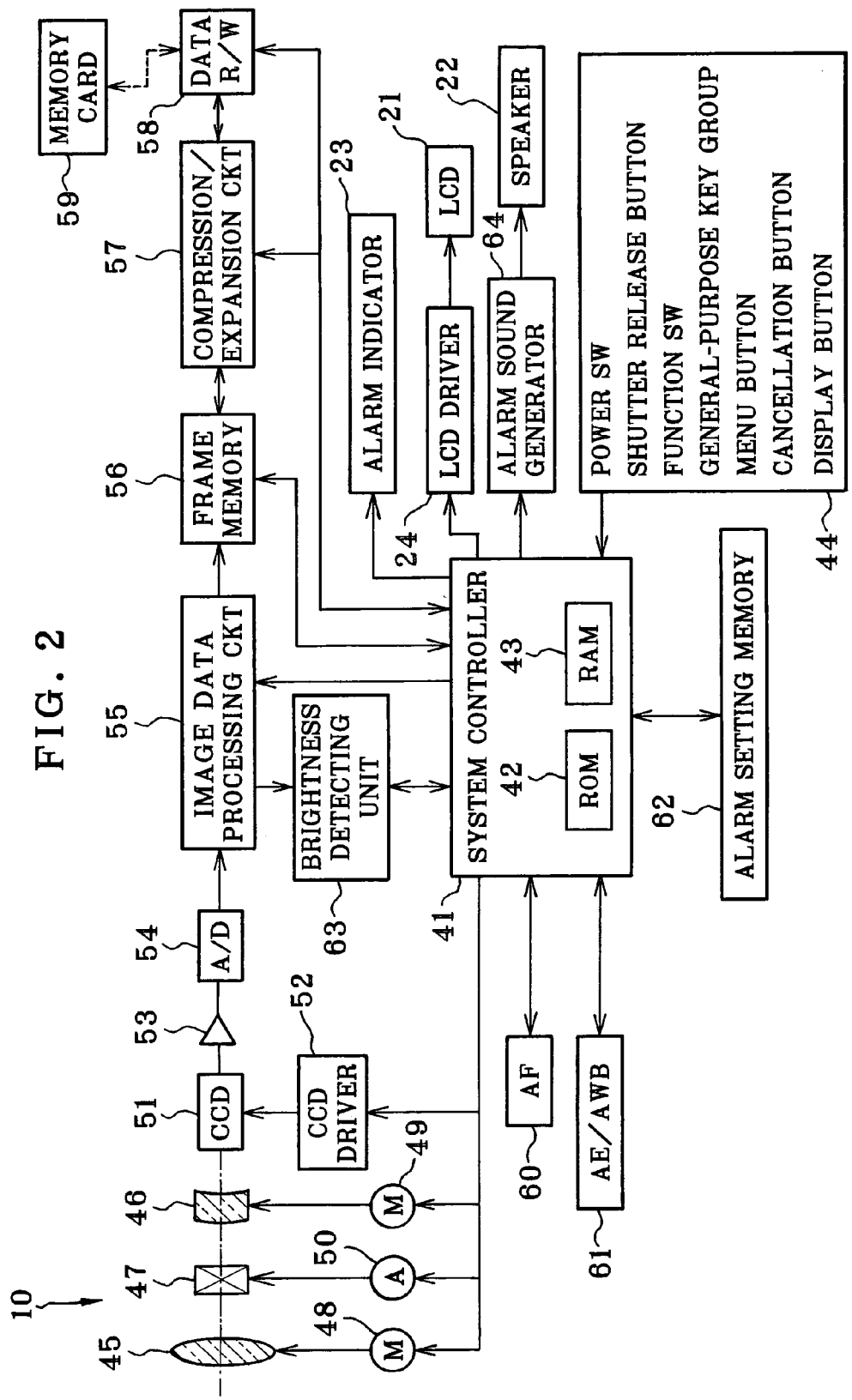

DIGITAL CAMERA WITH A MODE SELECTABLE STRUCTURE

BACKGROUND OF THE INVENTION

1. Field of the Invention

The present invention relates to a digital camera with a mode selectable structure. More particularly, the present invention relates to a digital camera with a mode selectable structure, in which a macro photographing mode is selectable, and which is capable of reliably generating an alarm signal of a present setting of the macro photographing mode.

2. Description Related to the Prior Art

A digital still camera includes a CCD image sensor and an image pickup optical system, and is loaded with a storage medium or memory. The CCD photographs an image of an object, to produced image data according to a pickup signal of the CCD. The image data is written to the memory. A widely used type of the digital still camera has a mode selectable structure in which a desired one of plural photographing modes can be designated, the photographing modes including a portrait mode, landscape mode, sport mode and the like. In the digital still camera, there are exposure conditions preset characteristically for the photographing modes, and adapted for image pickup according thereto.

A macro photographing mode is suitable for close-up photography or macro photography among the photographing modes. The macro photographing mode is characterized in that only objects at a near distance can be focused even though this near distance is so small as to be out of focus in other regular photographing modes different from the macro photographing mode among the photographing modes. However, if a user inadvertently photographs an object located at a far distance or middle distance by using the macro photographing mode, this results in failure in the image pickup because an image of the object is out of focus. To cope with such a problem requires giving alarm information to the user if the macro photographing mode is set.

U.S. Pat. No. 6,192,198 (corresponding to JP-A 6-194732) discloses the digital still camera in which the macro photographing mode and a panoramic photographing mode are settable. The panoramic photographing mode is to enlarge an aspect ratio of an image frame in the horizontal direction in comparison with a standard aspect ratio. The digital still camera in the document includes an alarm signaling LED (light-emitting diode), which is driven if the macro photographing mode and the panoramic photographing mode are selected simultaneously, to inform a user of an unsuitable situation by the alarm illumination. Furthermore, another known type of the digital still camera is capable of generating an alarm signal by displaying an alarm icon on a display panel. The icon is a visible form of an alarm signal, as the display panel continuously displays the icon while the macro photographing mode is set, or instantaneously displays the icon immediately upon setting the macro photographing mode. The user is informed of the setting of the macro photographing mode by the appearance of the icon on the display panel. If he or she becomes aware of a situation of not requiring the macro photographing mode, he or she can change the mode from the macro photographing mode over to one of the regular photographing modes.

Furthermore, a photographic camera in which sensitivity of photo film is selectable is known. In such a camera, a panoramic photographing mode is provided, and set for taking a photograph of a panoramic format. If an image is photograph panoramically with a photo film having a high photo film sensitivity, image quality will be low because of enlargement in the size. To solve a problem such a failure, JP-A 8-076238 discloses a camera in which the photo film sensitivity is detected in response to manual operation for changeover to the panoramic format. If the photo film sensitivity is equal to or higher than a reference sensitivity predetermined in the camera, an alarm signal is generated for the purpose of inhibiting the changeover to the panoramic format.

In the field of the digital still camera, however, known cameras do not have a structure of apparently clarified alarm or notice of an icon of the macro photographing mode at the same time as or shortly before the image pickup. A user is likely to miss or neglect the icon or indicia on the display panel for indicating the macro photographing mode. A problem arises in high probability in his or her error in the image pickup because of missing the setting of the macro photographing mode.

SUMMARY OF THE INVENTION

In view of the foregoing problems, an object of the present invention is to provide a digital camera with a mode selectable structure, in which a macro photographing mode is selectable, and which is capable of reliably generating an alarm signal of a present setting of the macro photographing mode.

In order to achieve the above and other objects and advantages of this invention, a digital camera includes a mode selector for setting a selected one of a regular photographing mode and a macro photographing mode adapted to image pickup at a near distance which is smaller than a nearest distance of an object which can be in focus by setting the regular photographing mode. An alarm generating device is responsive to depression of a shutter release button or recording trigger switch, for checking whether the macro photographing mode is set selectively, and for outputting an alarm signal if the macro photographing mode is set.

The alarm generating device includes a signal generator for outputting the alarm signal visually and/or audibly. A controller is responsive to depression of the shutter release button, for mode discernment by checking a state of the mode selector, and for driving the signal generator if the macro photographing mode is set selectively.

Furthermore, a display panel displays an image to be recorded and indicated information.

The shutter release button has a two-step depressible structure of two steps of a halfway depression and a full depression, and the full depression is adapted to still image recording of the image. The controller controls for the mode discernment upon the halfway depression of the shutter release button.

The half depression is adapted to determining an exposure condition of image recording.

In one preferred embodiment, the shutter release button has a two-step depressible structure of two steps of a halfway depression and a full depression, and the full depression is adapted to still image recording of the image. The controller controls for the mode discernment upon the full depression of the shutter release button.

The signal generator includes a sound source for audibly outputting the alarm signal.

The signal generator includes the display panel, a sound source and an alarm indicator, the display panel displays the indicated information of the alarm signal, and the sound source generates sound of the alarm signal. Furthermore, an input unit is operable for selecting at least one of the display panel, the sound source and the alarm indicator.

The display panel displays the indicated information in an enlarged manner.

The input unit is adapted to, when the display panel is selected, selecting at least one of first, second and third specific alarm output statuses being different from one another in a form of the indicated information on the display panel.

The controller controls the display panel, and when the first specific alarm output status is selected, enlarges the indicated information being displayed, and when the second specific alarm output status is selected, intermittently switches on and off the indicated information being displayed, and when the third specific alarm output status is selected, changes gradation of the indicated information being displayed.

Furthermore, there is a power switch for power supply of power. The controller controls for the mode discernment in response to turning on of the power switch.

Furthermore, a function selector sets a selected one of plural camera operation modes. The controller controls for the mode discernment upon selective setting of the function selector.

Furthermore, an input unit is operable for inputting to designate a first alarm output status adapted to alarm turning-off. If the first alarm output status is designated, the controller forcibly suppresses operation of the signal generator, and if the first alarm output status is not designated, the signal generator operates according to the mode discernment.

If the first alarm output status is not designated, then the input unit is adapted to inputting information of at least one of second and third alarm output statuses. The controller, if the second alarm output status is designated, determines whether the signal generator should be operated by considering a distance of the object according to the image data, and if the third alarm output status is designated, determines whether the signal generator should be operated by considering object brightness according to the image data.

Furthermore, a distance detecting unit is supplied with image data of the image, for detecting a distance of the object to adjust a focus. The controller further evaluates the distance, and if the distance is equal to or smaller than a predetermined limit distance, suppresses operation of the signal generator irrespective of a state of the mode selector, and if the distance is greater than the predetermined limit distance, controls the signal generator according to the mode discernment.

Furthermore, a brightness detecting unit is supplied with image data of the image, for detecting brightness of the object to control exposure. The controller further evaluates the object brightness, and if the object brightness is equal to or higher than a predetermined limit brightness, suppresses operation of the signal generator irrespective of a state of the mode selector, and if the object brightness is lower than the predetermined limit brightness, controls the signal generator according to the mode discernment.

According to one aspect of the invention, a digital camera has a shutter release button. A mode selector sets a selected one of a regular photographing mode and a high sensitivity photographing mode adapted to image pickup at a higher sensitivity than the regular photographing mode. A signal generator outputs an alarm signal visually and/or audibly. A controller is responsive to depression of the shutter release button, for mode discernment by checking a state of the mode selector, and for driving the signal generator if the high sensitivity photographing mode is set selectively.

Furthermore, an input unit is operable for inputting to designate a first alarm output status adapted to alarm turning-off. If the first alarm output status is designated, the controller forcibly suppresses operation of the signal generator, and if the first alarm output status is not designated, the signal generator operates according to the mode discernment.

If the first alarm output status is not designated, then the input unit is adapted to inputting information of at least one of second and third alarm output statuses. The controller, if the second alarm output status is designated, determines whether the signal generator should be operated by considering object brightness according to the image data, and if the third alarm output status is designated, determines whether the signal generator should be operated by considering type information of the image according to the image data.

The type information is at least one of a portrait image, landscape image, sport image, and night scene image.

Furthermore, a brightness detecting unit is supplied with image data of the image, for detecting brightness of an object to control exposure. The controller further evaluates the object brightness, and if the object brightness is equal to or lower than a predetermined limit brightness, suppresses operation of the signal generator irrespective of a state of the mode selector, and if the object brightness is higher than the predetermined limit brightness, controls the signal generator according to the mode discernment.

In one embodiment of the invention, a digital camera having a user interface comprises a mode selector for setting a selected one of a regular photographing mode and a macro photographing mode adapted to image pickup at a near distance which is smaller than a nearest distance of an object which can be in focus by setting the regular photographing mode. A controller is responsive to depression of a shutter release button, for checking whether the macro photographing mode is set selectively. The user interface includes an alarm generating region for outputting an alarm signal if the macro photographing mode is set.

The alarm generating region outputs the alarm signal visually and/or audibly.

The controller, responsive to depression of the shutter release button, checks a state of the mode selector, and drives the user interface if the macro photographing mode is set selectively.

The user interface comprises a display panel for displaying an image to be recorded and indicated information.

BRIEF DESCRIPTION OF THE DRAWINGS

The above objects and advantages of the present invention will become more apparent from the following detailed description when read in connection with the accompanying drawings, in which:

FIG. 2 is a block diagram schematically illustrating the digital still camera;

DETAILED DESCRIPTION OF THE PREFERRED EMBODIMENT(S) OF THE PRESENT INVENTION

Figure 1:
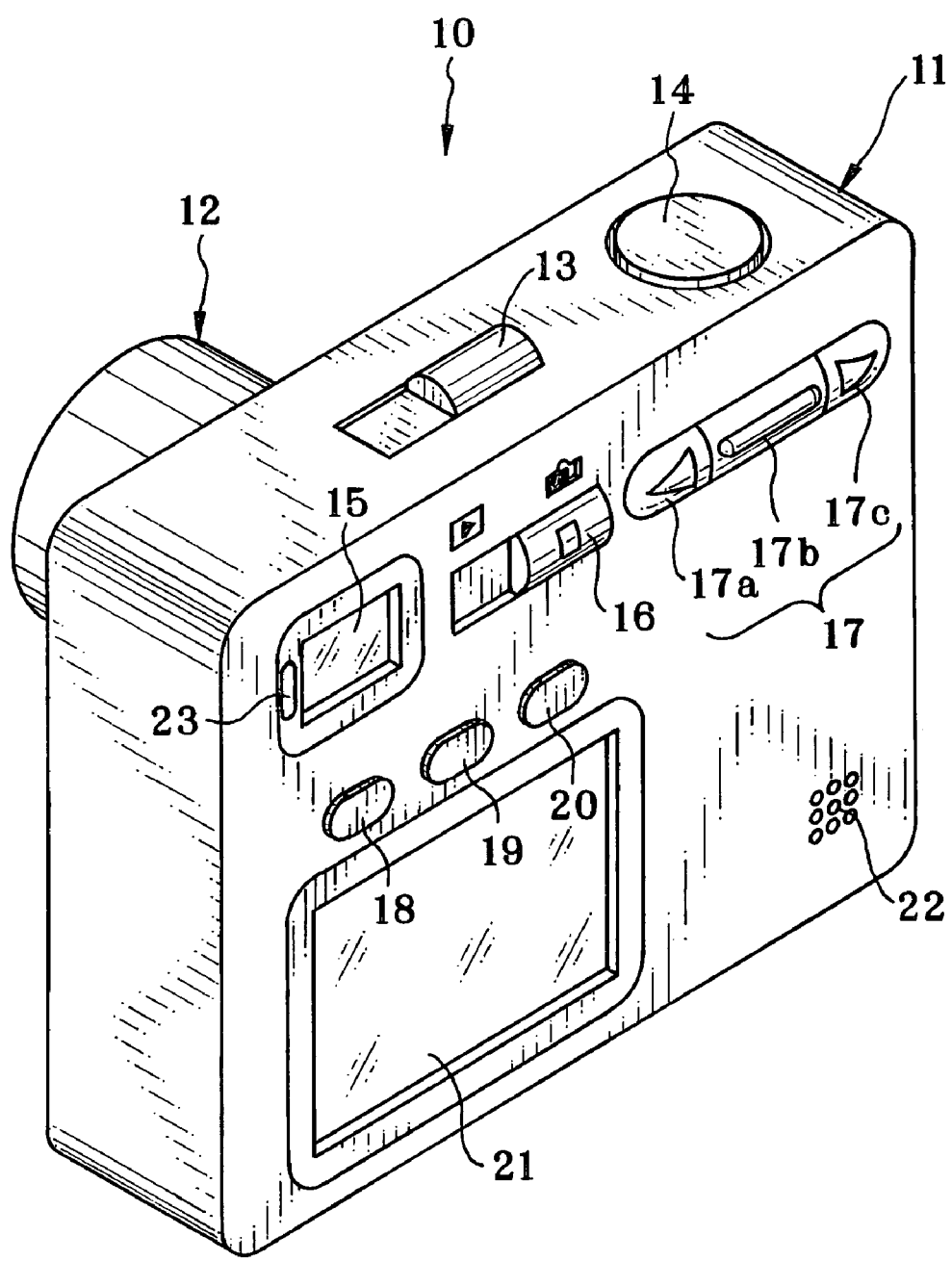
FIG. 1 is a perspective view illustrating a digital still camera.

In FIG. 1, a digital still camera 10 includes a camera body 11 and a lens barrel 12. The lens barrel 12 protrudes from a front of the camera body 11, and has a pickup lens incorporated therein. An upper face of the camera body 11 has a power switch 13 and a shutter release button or recording trigger switch 14. The shutter release button 14 has a construction depressible at two steps. At first, the shutter release button 14 is depressed to turn on for halfway depression or at a first step. This causes the digital still camera 10 to adjust the focusing of the taking lens, adjust the exposure and other items for image pickup. Also, the shutter release button 14 is more deeply depressed to turn on at the second step, in the form of full depression. Then a live image of an object being photographed is retrieved according to a pickup signal generated by a CCD image sensor. The image data of the image as a still image is written to a memory card.

The rear of the camera body 11 has a viewfinder eyepiece window 15, a function selector 16, a general-purpose key group 17 as mode selector, a menu button 18, a cancellation button 19, a display button 20, an LCD (liquid crystal) display panel 21 as alarm generating device, and a speaker 22 or sound source as alarm generating device. The viewfinder eyepiece window 15 constitutes an optical viewfinder including an objective lens and an eyepiece lens. A lamp of alarm indicator 23 as alarm generating device is disposed to the left of the viewfinder eyepiece window 15 as viewed in the drawing. A user observes a photographic object through the viewfinder, and at the same time sees light emitted by the alarm indicator 23.

The function selector 16 is operated for setting a selected one of a photographing mode and a playback mode for causing the LCD 21 to display an image read from a memory card. An LCD display driver 24 drives the LCD 21, which displays by playback, and also operates as an electronic viewfinder for displaying a live image of an object at the time of the photographing mode. Also, the LCD 21 displays a menu pattern for determining a setting of the various items.

When the menu button 18 is depressed, a setting menu pattern is displayed on the LCD 21. A setup mode is set by changing over from the photographing mode or playback mode. In the setting menu pattern, information of various items are shown for inputting command signals, the information including image adjusting items, such as RECORDING PIXEL NUMBER, ISO SENSITIVITY and SELECT SCENE, and function setting items, such as DATE/TIME, LANGUAGE and MACRO MODE BASED ALARM. The digital still camera 10 operates according to the conditions input by means of this setting menu pattern. The menu button 18 is also a confirming/executing button for confirming and executing the functions of the selected items.

The general-purpose key group 17 selects one of the images to be played back, and also shifts a cursor indicated in the menu pattern. The general-purpose key group 17 includes general-purpose keys 17a and 17c on the left and right, and a general-purpose key 17b at the center. The general-purpose keys 17a and 17c at the horizontal ends are pushbuttons. The general-purpose key 17b at the center is rotatable upwards and downwards pivotally about an axis that extends horizontally. At the time of the photographing mode, the general-purpose key 17b operates as a zoom button. The cancellation button 19 is used to cancel a selected one of plural items or alarm output statuses. The display button 20 turns on and off the LCD 21.

When the menu pattern of the SELECT SCENE is shown, one of plural photographing modes can be selected in consideration a scene to be photographed. Examples of the items for selection include PORTRAIT adapted to image pickup of a portrait of a person, LANDSCAPE adapted to image pickup of a landscape, and MACRO adapted to image pickup in macro photography or close-up photography. A selection cursor on the menu is shifted to select a desired one of the items, before the menu button 18 is depressed for a second time. Thus, the selected item is confirmed and input. The image on the LCD 21 changes over from the setting menu pattern to an initial pattern.

In FIG. 2, various electrical elements in the digital still camera 10 are illustrated schematically. A system controller 41 as mode detector in alarm generating device controls the digital still camera 10. A ROM 42 stores a control program, and data of various menu patterns including a setting menu pattern. A key panel 44 is constituted by the shutter release button 14, the general-purpose key group 17 and the menu button 18, and supplies the controller 41 with instruction signals. In response, the controller 41 controls by following the steps described in the process according to the control program. A RAM 43 is a work memory with which the controller 41 executes the control program.

The lens barrel 12 includes a taking lens and an aperture stop mechanism 47. The taking lens is constituted by a variator lens group 45 for zooming, and a focusing lens group 46. A zoom motor 48 is caused by a motor driver to move the variator lens group 45 in the optical axis direction. A focusing motor 49 is caused by a motor driver to move the focusing lens group 46 in the optical axis direction. The variator lens group 45 changes the magnification of an image optically. The focusing lens group 46 adjusts the focal point. An actuator 50 such as a solenoid is caused by a driver to actuate the aperture stop mechanism 47, to change an aperture stop defined within the aperture stop mechanism 47.

A CCD image sensor 51 is disposed behind the focusing lens group 46. As is well-known in the art, the CCD 51 has a detection surface on which a great number of elements of photoreceptors in a matrix form. Object light is focused on the detection surface upon passing the variator lens group 45, the focusing lens group 46 and the aperture stop mechanism 47, and is converted by the CCD 51 photoelectrically into a signal.

A CCD driver 52 drives the CCD 51. Exposure time or charge storing time of the CCD 51 is determined according to an electronic shutter driving signal supplied by the CCD driver 52. The CCD driver 52 supplies vertical transfer clock and horizontal transfer clock, in synchronism with which the charge stored for each of the pixels is output per one line as a pickup signal in a serial form.

The pickup signal output from the CCD 51 is sent to a correlated double sampling (CDS) circuit and subjected to elimination of noise. After this, an amplifier 53 amplifies the pickup signal, which is input to an A/D converter 54. Image data is output by the A/D converter 54 converting the pickup image into a digital form. An image data processing circuit 55 is provided with the image data.

The image data processing circuit 55 receives the input image data, and subjects the image data to various manners of image processing, including matrix calculation, white balance adjustment, gamma correction, and the like. There is a frame memory 56 in which the image data after the image processing is stored in a temporary manner. The image data in the frame memory 56 is read out as a live image which is displayed on the LCD 21.

Upon the image pickup, image data stored in the frame memory 56 is sent to a compression/expansion circuit 57. A data reader/writer 58 is supplied with image data after being compressed in the compression/expansion circuit 57. There is a memory card 59 as storage medium to which the data reader/writer 58 writes the compressed image data. In the playback mode, the data reader/writer 58 reads an image file of the image data from the memory card 59. The image data is subjected to expansion or decompression by the compression/expansion circuit 57, and is output to the LCD 21.

An AF (autofocus) unit 60 as a distance detecting unit is supplied with image data read from the frame memory 56, and detects an in-focus position by analyzing the image data. An example of method of detecting the in-focus position is a passive type for detection according to high contrast obtained when the image is in-focus.

An AE/AWB (auto exposure/auto white-balance) unit 61 as brightness detecting unit is supplied with image data read from the frame memory 56, detects object brightness by analysis of levels of image data per points, and calculates various values, including an aperture stop value, exposure time, use or lack of emission of flash light, correcting amount of white balance correction, and the like.

The in-focus position, aperture stop value, exposure time and other conditions for exposure are obtained from the AF unit 60 and the AE/AWB unit 61, and are written to RAM 43 by the controller 41. The controller 41 controls various elements of the camera according to the exposure conditions and settings input by means of the setting menu pattern, and carries out the image pickup.

If the MACRO is selected in the selection menu pattern of SELECT SCENE in the digital still camera 10, then the macro photographing mode is set. If any one of the items other than the MACRO is selected in the menu pattern, then the regular photographing mode is set. When a user depresses the shutter release button 14, it is responsively checked whether the macro photographing mode is set at present. If it is, then an alarm signal is clearly output in the digital still camera 10 for alarm purpose of the present macro condition.

An alarm setting memory 62 is incorporated in the digital still camera 10 for storing data of menu patterns for determining a setting for MACRO MODE BASED ALARM on the LCD 21. A user can view the macro alarm setting menu pattern, and input a signaling method and an alarm output status for the alarm signal of the macro photographing mode.

Figure 3A:
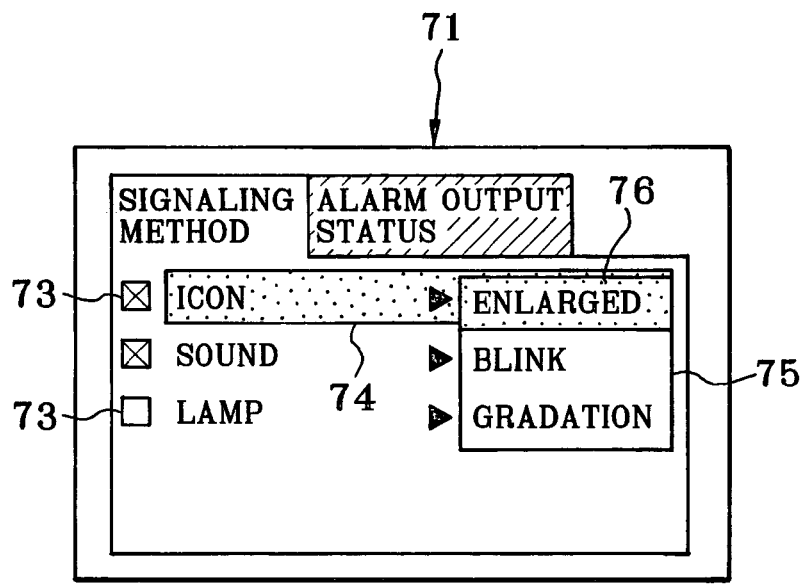
FIG. 3A is a front elevation illustrating a menu pattern for alarm setting of a macro photographing mode.
Figure 3B:
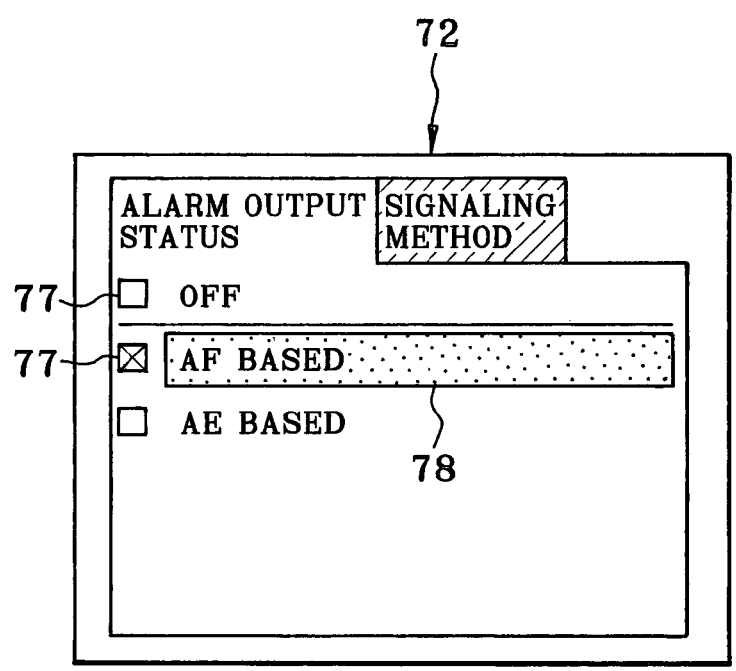
FIG. 3B is a front elevation illustrating a menu pattern of FIG. 3A but for alarm output statuses.

The setting menu pattern for alarm signaling of the macro photographing mode is a selectively pointed one of two subsidiary menu patterns 71 and 72. In FIG. 3A, the subsidiary menu pattern 71 constituting an alarm selector has a menu for selecting of signaling methods. In FIG. 3B, the subsidiary menu pattern 72 constituting the alarm selector and an alarm switch circuit has a menu for selecting alarm output statuses. The subsidiary menu patterns 71 and 72 are displayed not at the same time but selectively by switching. A portion of a tag in the menu pattern is colored in a gray out manner according to an unselected one of the subsidiary menu patterns 71 and 72. To switch the subsidiary menu patterns 71 and 72, the general-purpose keys 17a and 17c are used and depressed.

The subsidiary menu pattern 71 shows specific alarm output statuses of ICON, SOUND and LAMP. Check boxes 73 are disposed to the left of the items of the specific alarm output statuses. An alarm selection cursor 74 as alarm selector is movable, and is set on a selected one of the check boxes 73 to check and designate specific alarm output statuses. It is possible for a user to check one of the check boxes 73, and also two or more of the check boxes 73.

The items of the alarm signals of the various types are described now. If the ICON is checked, then an icon for the alarm is indicated in the LCD 21. If the SOUND is checked, then an alarm sound generator 64 is driven for the speaker 22 to emanate an audible message of voice for the alarm. If the LAMP is checked, then the alarm indicator 23 is caused to illuminate. For any of the those types of the items of the alarm signals, generating each alarm signal is time-sequentially set at the same time as half depression of the shutter release button 14 by the user. If two or more of the signaling methods are checked, then alarm signals of two or more kinds are emanated.

The alarm selection cursor 74 is kept set on a checked one of the specific alarm output status. The general-purpose key 17c is depressed, so a setting menu pattern 75 is displayed for detailed settings. The setting menu pattern 75 is adapted to determining specific alarm output statuses for the basic signaling methods. In FIG. 3A, the setting menu pattern 75 associated with the ICON displays specific alarm output statuses suitable for an icon, for example, ENLARGED, BLINK and GRADATION. A cursor 76 is shifted to designate a selected one of the specific alarm output statuses. When BLINK is selected, the icon is intermittently switched on and off, and when GRADATION is selected, the icon is changed in gradation.

Figure 4A:
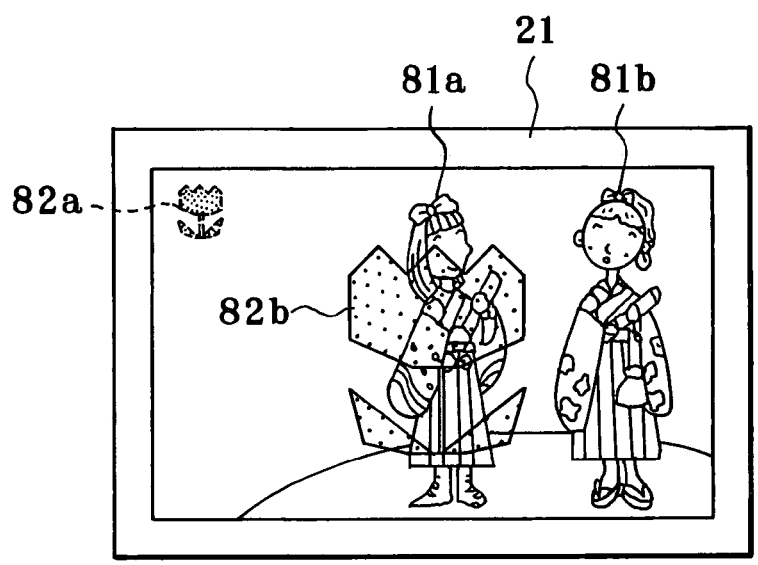
FIG. 4A is a front elevation illustrating information of an alarm icon combined with an image.
Figure 4B:
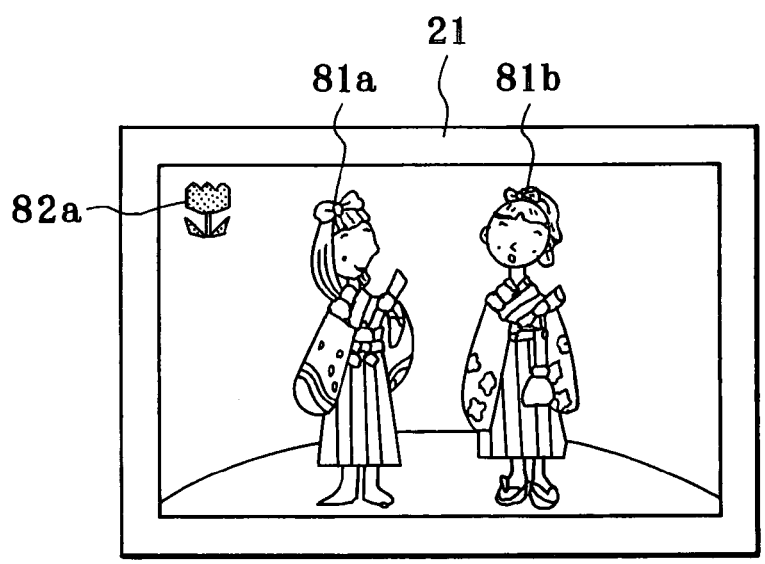
FIG. 4B is a front elevation illustrating information of the alarm icon of FIG. 4A but in a minimized form.

In FIGS. 4A and 4B, the alarm signaling of one type is illustrated at the time of selecting ICON as an alarm signaling method, and ENLARGED as a specific alarm output status. When one of the photographing modes is determined by operating the function selector 16, the LCD 21 is turned on automatically, and caused to display a live image. An alarm icon 82a is displayed on the LCD 21 in addition to the live image to inform the present state of the macro photographing mode. For the alarm icon 82a as alarm signal, see the portion indicated by the broken lines in FIG. 4A.

In an image pickup of a still image, a photographic object 81a which a user wishes to focus is targeted at the center of the field of view. The shutter release button 14a is halfway depressed. The alarm icon 82a changes in its position and size and becomes an enlarged alarm icon 82b as alarm signal. The position changes from the corner of the LCD 21 to its center. The size becomes enlarged gradually. The enlarged alarm icon 82b keeps the state of FIG. 4A for a predetermined duration of time, and then becomes the form of the alarm icon 82a again in the minimized size near to the corner of the LCD 21. After this, the center of the field of view is set at a point between the object 81a and a photographic object 81b for framing. See FIG. 4B. The shutter release button 14 is depressed fully to pick up an image. Note that the predetermined duration of time for keeping the enlarged alarm icon 82b maximized at the center of the LCD 21 is settable by manual operation of a user. The time can be adjusted in order not to obstruct the framing operation.

In FIG. 3B, various items of alarm output statuses are indicated in the subsidiary menu pattern 72, including OFF ALARM, AF BASED ALARM and AE BASED ALARM. To select one of the alarm output statuses at the items, an alarm selection cursor 78 is used in a manner similar to selection of the alarm signaling method. At least one of check boxes 77 is selected by checking, to determine the status of the alarm. The check boxes 77 and the alarm selection cursor 78 constitute an alarm selector and alarm switch circuit. It is noted that in the digital still camera 10, only one of the conditions is settable.

The alarm output statuses of those items are described specifically now. If the item OFF ALARM is selectively checked, then the alarm signaling is suppressed regarding the macro photographing mode without exception. If any one item of the AF BASED ALARM and AE BASED ALARM is selected, it is checked whether the alarm signaling of the macro photographing mode should be made according to exposure conditions on the basis of the image data of the object. For the determination, the AF unit 60 is used for the AF BASED ALARM. The AE/AWB unit 61 is used for the AE BASED ALARM.

The AF unit 60 detects a distance of the object by evaluating the input image data, and sends the detected distance to the controller 41. If the detected distance is greater than a reference distance, or if failure occurs in detection of a distance in the AF unit 60, then the controller 41 determines that the macro photographing mode is improper. The AE/AWB unit 61 measures object brightness by evaluating the input image data, and if the measured brightness is lower than a reference brightness, the controller 41 determines that the macro photographing mode is improper. The controller 41 uses a selected one of the alarm signaling methods to generate the alarm signal of the macro photographing mode when the digital still camera 10 is in the macro photographing mode and when the macro photographing mode is improper.

Alternatively the AF unit 60 may detect a focal length defined from the taking lens to a focal point. The focal length can be evaluated, and if greater than a reference focal length, is determined as inconsistent for the macro photographing mode because of a telephoto condition.

The operation of the embodiment constructed above is described. At first, a user determines the signaling methods and alarm output statuses for alarm signaling regarding the macro photographing mode. The LCD 21 is caused to display a setting menu pattern of either of the subsidiary menu patterns 71 and 72. He or she views the subsidiary menu pattern 71 and selects ICON and SOUND among the plural signaling methods. Also, ENLARGED is selected in FIG. 3A as a specific alarm output status for the selected ICON as a basic signaling method. He or she views the subsidiary menu pattern 72 in FIG. 3B and selects AF BASED ALARM among the plural alarm output statuses.

For the macro photography of a flower or the like, at first a user depresses the shutter release button or recording trigger switch 14 by half depression. Conditions of the exposure for the image pickup are determined. At the same time as the conditions are determined, it is checked whether a photographing mode set at present is the macro photographing mode or not. If it is, then a detected length of an object is checked in comparison with a reference length for the purpose of check whether the macro photographing mode is suitable for the object to be picked up under the present conditions. As the detected length detected by the AF unit 60 is greater than the reference length, it is determined that the selected macro photographing mode is unsuitable. Thus, an alarm signal is produced visually and/or audibly.

The alarm signaling is made at the same time for the plural signaling methods. For the ICON signaling method, the alarm icon 82a or 82b is indicated in an enlarged form for a predetermined time on the LCD 21. See FIG. 4A. For the SOUND signaling method, the speaker 22 or sound source generates an alarm message of a recorded voice. A user is informed by the alarm signaling that the macro photographing mode set at present is not suitable for the exposure conditions. Consequently, the macro photographing mode is changed over to one of other photographing modes. He or she depresses the shutter release button 14 fully, to pick up an image. Image data of a still image is written to the memory card 59.

As described above, the alarm signaling for the macro photographing mode is responsive to the manual depression of the shutter release button 14. It is possible to inform a user reliably of the setting of the macro photographing mode. Failure in the image pickup can be prevented. Also, the alarm is selectable between the visible alarm signal by the alarm icon 82a or 82b and the alarm indicator 23 and the audible alarm signal by the sound. Additionally, the alarm output status can be selected from the plural prescribed statuses. The operability of the digital still camera 10 can be high.

Note that indicia, symbols, words, alphanumeric signs or the like may be indicated on the LCD 21 instead of the alarm icon 82a or 82b. Also, beep sound, buzz, or other audible alarm sound can be generated by the speaker 22, buzzer or other sound source, instead of the alarm message of a recorded voice.

In the above embodiment, generation of the alarm signal is responsive to the halfway depression of the shutter release button 14. However, the generation of the alarm signal can be responsive to a full depression of the shutter release button 14. A form of the alarm signal responsive to the full depression of the shutter release button 14 may be different from that responsive to the halfway depression. For example, portions of an object image in the LCD 21 having lower brightness may be indicated in an artificially enlarged manner. It is also possible to encourage a user to check an object image to be picked up.

In the above embodiment, the alarm signaling is for one time responsive to halfway depression of the shutter release button 14 for one time. However, the alarm signal may be generated for two or more times. Furthermore, the alarm signaling can be responsive to operation of initially powering the camera, operation of changing over the camera operation modes, or photographing modes.

In the above embodiment, the AF BASED ALARM and AE BASED ALARM are provided in the alarm output statuses of the macro photographing mode in consideration of the environment for the image pickup. However, it is possible to add an alarm output status of FLASH BASED ALARM. Examples of specific alarm output statuses for the alarm output status of the FLASH BASED ALARM include AUTOMATIC FLASH, FORCIBLE FLASH, SLOW SYNC FLASH and the like. Note that a default specific alarm output status among those can be determined as FORCIBLE FLASH.

In the above embodiments, the camera is the digital still camera, in which a still image is picked up. However, a camera according to the invention can be a video camera, with which images of the motion picture may be recorded.

Figure 5:
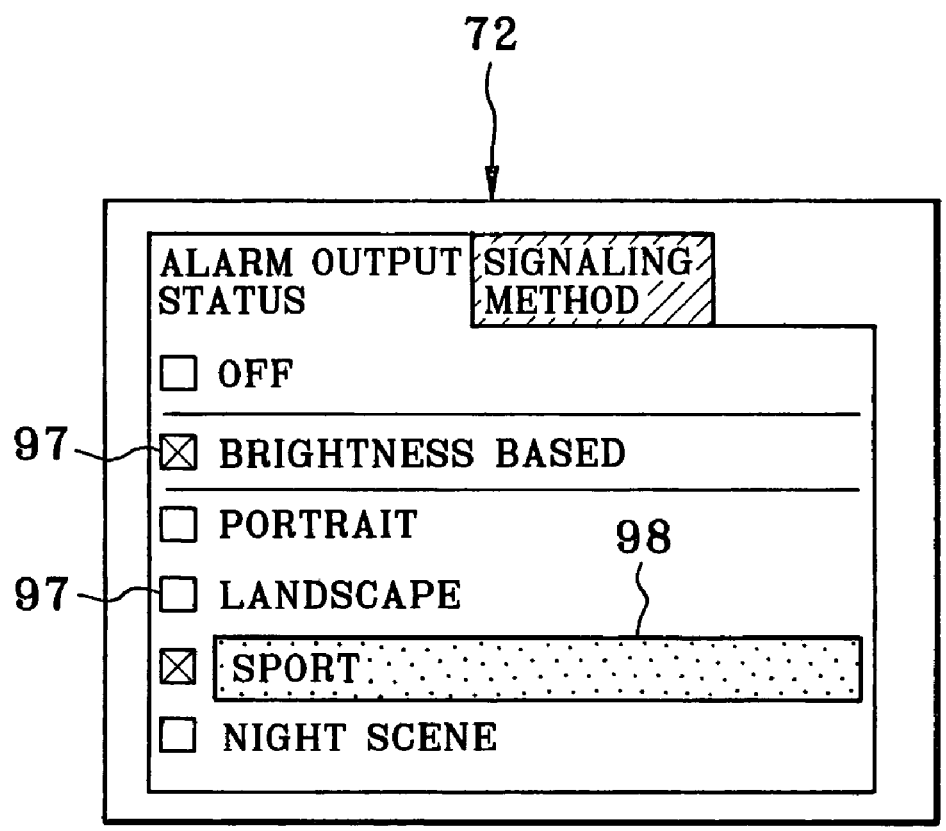
FIG. 5 is a front elevation illustrating a menu pattern for alarm setting of a high sensitivity photographing mode.
Figure 6A:
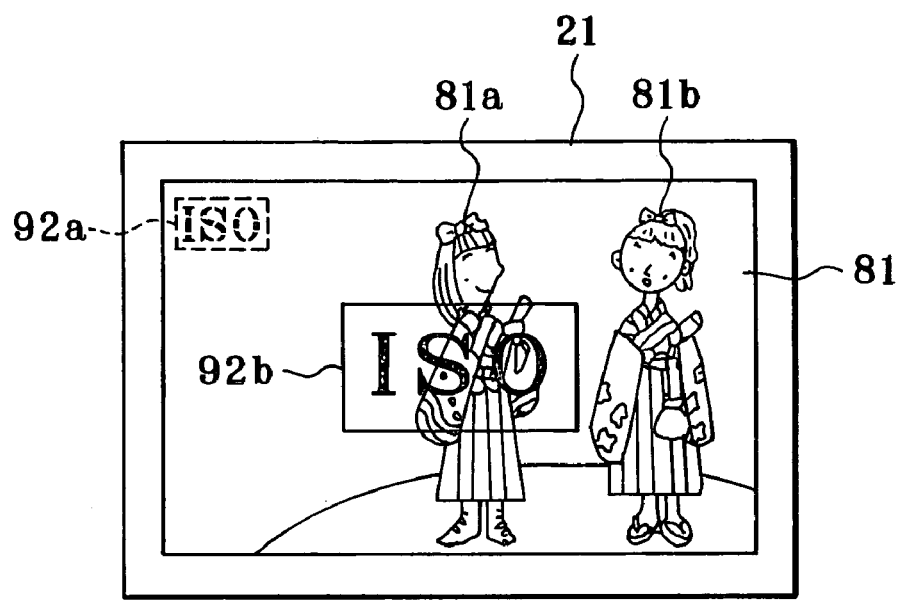
FIG. 6A is a front elevation illustrating information of an alarm icon combined with an image.
Figure 6B:
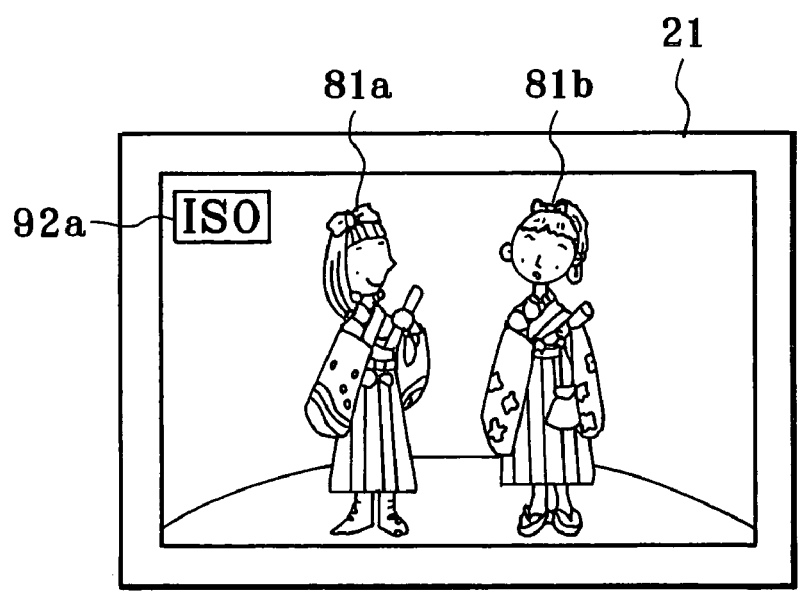
FIG. 6B is a front elevation illustrating information of the alarm icon of FIG. 6A but in a minimized form.

In FIGS. 5, 6A and 6B, another preferred embodiment is illustrated, in which a high sensitivity photographing mode is checked and used for generating an alarm signal as required. The LCD 21 is changeable to show a menu pattern for setting of the ISO SENSITIVITY by selection from the items of 100, 200, 400, 800, 1,600 and AUTO. Also, a menu pattern is shown for setting of SELECT SCENE by selection from the specific alarm output statuses of PORTRAIT, LANDSCAPE, SPORT and NIGHT SCENE.

The CCD driver 52 drives the CCD 51. Exposure time or charge storing time of the CCD 51 is determined according to an electronic shutter driving signal, which is supplied by the CCD driver 52 and determined according to the sensitivity adjusted by selection at the setting menu pattern of the ISO SENSITIVITY.

The amplifier 53 is connected between the CCD 51 and the A/D converter 54. For the amplifier 53, a level of amplification is determined for the selected sensitivity level by means of the menu pattern of the ISO SENSITIVITY. The amplifier 53 amplifies the pickup signal according to the amplification level. Image data is output by the A/D converter 54 converting the pickup image into a digital form. The image data processing circuit 55 is provided with the image data.

In the digital still camera 10, the standard sensitivity and high sensitivity photographing modes are determined that the first corresponds to sensitivity lower than ISO 400, and the second corresponds to sensitivity equal to or higher than ISO 400. When a user depresses the shutter release button 14, information of the ISO sensitivity set in the digital still camera 10 is read, so as to check whether the high sensitivity photographing mode is set in the digital still camera 10. If it is, then an alarm signal for the high sensitivity photographing mode of the digital still camera 10 is generated.

The alarm setting memory 62 in the digital still camera 10 stores data of a menu pattern, of which information of HIGH SENSITIVITY BASED ALARM is indicated on the LCD 21.

In FIG. 6A, an alarm icon 92a as alarm signal is displayed on the LCD 21 in addition to the live image to inform the present state of the high sensitivity photographing mode. For the alarm icon 92a as alarm signal, see the portion indicated by the broken lines in the drawing.

In the still image pickup, the object 81a to be focused is framed at the center of the field of view. The shutter release button 14 is depressed halfway during the framing. Then the alarm icon 92a of FIG. 6B is controlled to change the appearance. The alarm icon 92a is gradually changed to an enlarged alarm icon 92b as alarm signal by increasing its size, and by shifting its position from the upper left corner of the LCD 21 to the center. The enlarged alarm icon 92b remains in the state indicated in FIG. 6A for a predetermined duration of time. Immediately after this, it returns to the alarm icon 92a by changing the size and the position on the LCD 21. See FIG. 6B.

In FIG. 5, various items of alarm output statuses are indicated in the subsidiary menu pattern 72, including OFF ALARM, BRIGHTNESS BASED ALARM, PORTRAIT, LANDSCAPE, SPORT and NIGHT SCENE. To select one of the alarm output statuses at the items, an alarm selection cursor 98 is used in a manner similar to the alarm signaling method. At least one of check boxes 97 is selected by checking, to determine the status of the alarm. The check boxes 97 and the alarm selection cursor 98 constitute an alarm selector and alarm switch circuit. It is noted that in the digital still camera 10, one or more of the alarm output statuses is settable.

The alarm output statuses of those items are described specifically now. If the item OFF ALARM is selectively checked, then the alarm signaling is suppressed regarding the high sensitivity without exception. If the item BRIGHTNESS BASED ALARM is selected, it is checked whether the alarm signaling should be made according to object brightness on the basis of the image data of the object. To detect the object brightness, a brightness detecting unit 63 is used. The image data processing circuit 55 is responsive to a command signal from the controller 41, and sends processed image data to the brightness detecting unit 63 after image processing. The brightness detecting unit 63 detects object brightness by evaluating the input image data, and if the detected brightness is higher than reference brightness, sends a signal for generation of the alarm to the controller 41. In contrast, if the detected brightness is equal to or lower than the reference brightness, no signal for generation of the alarm is transmitted. The controller 41 uses a selected one of the alarm signaling methods to generate the alarm signal of the high sensitivity photographing mode when the digital still camera 10 is in the high sensitivity photographing mode and when the brightness detecting unit 63 outputs a signal for generation of the alarm.

In operation, a user views the subsidiary menu pattern 71 with information of plural alarm signaling methods, and selects ICON and SOUND which may be MELODY. Also, he or she views a menu pattern with plural specific alarm output statuses, and selects ENLARGED. See FIG. 3A. In FIG. 5, he or she views the subsidiary menu pattern 72 with plural alarm output statuses, and selects BRIGHTNESS BASED ALARM. In addition to the BRIGHTNESS BASED ALARM, the SPORT is selected. Note that the SPORT has been selected because predetermined as a default mode stored in the camera.

To pick up a still image, at first a user depresses the shutter release button 14 by half depression. Conditions of the exposure for the image pickup are determined. At the same time as the conditions are determined, it is checked whether a photographing mode set at present is the high sensitivity photographing mode or not. If it is, then it is judged that the alarm signal should be generated or not according to the designated one of the alarm output statuses.

If the items of the BRIGHTNESS BASED and SPORT are selected, then the photographing mode set at present is checked. If the photographing mode set at present is the sport mode, then the alarm signaling is made. If the photographing mode set at present is one of the photographing modes other than the sport mode, then object brightness is retrieved by considering the image data of the object. If the detected brightness is higher than the reference brightness, the alarm signal is generated. If the detected brightness is equal to or lower than the reference brightness, no alarm signal is generated.

In the present embodiment, the mode set at the present is checked at first, to determine whether any one of the modes with higher priority is set at present or not. After this, the detected object brightness is evaluated as to being higher than the reference brightness. However, the sequence of those steps may be suitably determined in a different manner.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A digital camera comprising:
  a mode selector for setting a selected one of a regular photographing mode and a macro photographing mode adapted to image pickup at a near distance which is smaller than a nearest distance of an object which can be in focus by setting said regular photographing mode;
  an alarm generating device, responsive to depression of a shutter release button, for checking whether said macro photographing mode is set selectively, and for outputting an alarm signal if said macro photographing mode is set;
  wherein said alarm generating device includes:
  a signal generator for outputting said alarm signal visually and/or audibly; and
  a controller, responsive to depression of said shutter release button, for mode discernment by checking a state of said mode selector, and for driving said signal generator if said macro photographing mode is set selectively;
  further comprising a display panel for displaying an image to be recorded and indicated information;

wherein said signal generator includes said display panel, a sound source and an alarm indicator, said display panel displays said indicated information of said alarm signal, and said sound source generates sound of said alarm signal;

further comprising an input unit operable for selecting at least one of said display panel, said sound source and said alarm indicator; and wherein said input unit is adapted to, when said display panel is selected, selecting at least one of first, second and third specific alarm output statuses being different from one another in a form of said indicated information on said display panel.

2. A digital camera comprising:

a mode selector for setting a selected one of a regular photographing mode and a macro photographing mode adapted to image pickup at a near distance which is smaller than a neatest distance of an object which can be in focus by setting said regular photographing mode;

an alarm generating device, responsive to depression of a shutter release button, for checking whether said macro photographing mode is set selectively, and for outputting an alarm signal if said macro photographing mode is set;

wherein said alarm generating device includes:

a signal generator for outputting said alarm signal visually and/or audibly; and a controller, responsive to depression of said shutter release button, for mode discernment by checking a state of said mode selector, and for driving said signal generator if said macro photographing mode is set selectively;

further comprising a display panel for displaying an image to be recorded and indicated information; and further comprising an input unit operable for inputting to designate a first alarm output status adapted to alarm turning-off;

if said first alarm output status is designated, said controller forcibly suppresses operation of said signal generator, and if said first alarm output status is not designated, said signal generator operates according to said mode discernment.

3. A digital camera as defined in claim 1 or 2, wherein said shutter release button has a two-step depressible structure of two steps of a halfway depression and a full depression, and said full depression is adapted to still image recording of said image;

said controller controls for said mode discernment upon said halfway depression of said shutter release button.

4. A digital camera as defined in claim 3, wherein said half depression is adapted to determining an exposure condition of image recording.

5. A digital camera as defined in claim 1 or 2, wherein said shutter release button has a two-step depressible structure of two steps of a halfway depression and a full depression, and said full depression is adapted to still image recording of said image;

said controller controls for said mode discernment upon said full depression of said shutter release button.

6. A digital camera as defined in claim 1 or 2, wherein said signal generator includes a sound source for audibly outputting said alarm signal.

7. A digital camera as defined in claim 1, wherein said controller controls said display panel, and when said first specific alarm output status is selected, enlarges said indicated information being displayed, and when said second specific alarm output status is selected, intermittently switches on and off said indicated information being displayed, and when said third specific alarm output status is selected, changes gradation of said indicated information being displayed.

8. A digital camera as defined in claim 1 or 2, further comprising a power switch for power supply of power;

said controller controls for said mode discernment in response to turning on of said power switch.

9. A digital camera as defined in claim 1 or 2, further comprising a function selector for setting a selected one of plural camera operation modes;

said controller controls for said mode discernment upon selective setting of said function selector.

10. A digital camera as defined in claim 1 or 2, further comprising a distance detecting unit, supplied with image data of said image, for detecting a distance of said object to adjust a focus;

said controller further evaluates said distance, and if said distance is equal to or smaller than a predetermined limit distance, suppresses operation of said signal generator irrespective of a state of said mode selector, and if said distance is greater than said predetermined limit distance, controls said signal generator according to said mode discernment.

11. A digital camera as defined in claim 1 or 2, further comprising a brightness detecting unit, supplied with image data of said image, for detecting brightness of said object to control exposure;

said controller further evaluates said object brightness, and if said object brightness is equal to or higher than a predetermined limit brightness, suppresses operation of said signal generator irrespective of a state of said mode selector, and if said object brightness is lower than said predetermined limit brightness, controls said signal generator according to said mode discernment.

12. A digital camera as defined in claim 2, wherein said signal generator includes said display panel, a sound source and an alarm indicator, said display panel displays said indicated information of said alarm signal, and said sound source generates sound of said alarm signal;

further comprising an input unit operable for selecting at least one of said display panel, said sound source and said alarm indicator.

13. A digital camera as defined in claim 1 or 12, wherein said display panel displays said indicated information in an enlarged manner.

14. A digital camera as defined in claim 2, wherein if said first alarm output status is not designated, then said input unit is adapted to inputting information of at least one of second and third alarm output statuses;

said controller, if said second alarm output status is designated, determines whether said signal generator should be operated by considering a distance of said object according to said image data, and if said third alarm output status is designated, determines whether said signal generator should be operated by considering object brightness according to said image data.

* * * * *